United States Patent
Ogawa et al.

(10) Patent No.: US 6,773,808 B2
(45) Date of Patent: Aug. 10, 2004

(54) ADHESIVE FILM

(75) Inventors: Atsuko Ogawa, Rocklin, CA (US); Akihiro Ichige, Chiba (JP); Hidetake Hozumi, Ichihara (JP)

(73) Assignee: Sumitomo Chemical Company, Ltd., Osaka (JP)

(*) Notice: Subject to any disclaimer, the term of this patent is extended or adjusted under 35 U.S.C. 154(b) by 100 days.

(21) Appl. No.: 10/053,597

(22) Filed: Jan. 24, 2002

(65) Prior Publication Data

US 2002/0164491 A1 Nov. 7, 2002

(30) Foreign Application Priority Data

Jan. 31, 2001 (JP) ........................................ 2001-023247

(51) Int. Cl.$^7$ .............................................. B32B 27/32
(52) U.S. Cl. ...................... 428/349; 428/515; 428/516; 428/523; 525/240; 526/248; 526/943
(58) Field of Search ................................ 428/515, 516, 428/349, 523; 525/240; 526/348, 943

(56) References Cited

FOREIGN PATENT DOCUMENTS

| JP | 4-55488 | 2/1992 |
|---|---|---|
| JP | 8-157791 | 6/1996 |

OTHER PUBLICATIONS

JP-08-157791, Jun. 1996, Machine Translation from Japanese Patent Office web site.*
JP-08-1311419, Nov. 1996, Machine Translation from Japanese Patent Office web site.*

* cited by examiner

*Primary Examiner*—D. Lawrence Tarazano
(74) *Attorney, Agent, or Firm*—Sughrue Mion, PLLC

(57) ABSTRACT

There is provided an adhesive film comprising:
  (i) a substrate layer, which comprises a thermoplastic resin, and
  (ii) an adhesive layer, which comprises an olefin copolymer, wherein the olefin copolymer comprises polymerization units of at least two olefins selected from the group consisting of ethylene and α-olefins having 3 to 20 carbon atoms, and the olefin copolymer satisfies the requirements:
    (a) the olefin copolymer has neither a peak of crystal melting calorie of not less than 1 J/g, nor a peak of crystallization calorie of not less than 1 J/g in a differential scanning calorimetry according to JIS K 7122, and
    (b) a molecular weight distribution of the olefin copolymer, Mw/Mn, is not more than 3.

7 Claims, No Drawings

ADHESIVE FILM

FIELD OF THE INVENTION

The present invention relates to an adhesive film. The adhesive film in accordance with the present invention can be used particularly preferably (i) as a surface protecting film applied to a surface of articles such as synthetic resin boards, decorated plywood, metal plates and coated steel boards in order to protect the surface thereof from undesired effects such as deposition of dusts and any scratch, or (ii) as a surface protecting film usable at the time of bake-coating of cars, or dip-soldering of printed-circuit boards. In the present invention, the term "adhesive film" also means an adhesive sheet and an adhesive tape.

BACKGROUND OF THE INVENTION

In recent years, there have been used (1) an adhesive film, which comprises (a) a substrate layer containing a polyolefin resin and (b) an adhesive layer containing a low crystalline or non-crystal polymer such as EVA and low density polyethylene, and (2) an adhesive film, which comprises (a) the same substrate layer as mentioned above and (b) an adhesive layer containing an elastomer such as SIS and SEBS.

However, the above-mentioned adhesive films have problems that (1) stickiness of these adhesive films increases with an elapse of time under a high temperature circumstance, and as a result, it becomes difficult to peel the adhesive film from a surface of an article, or (2) when peeled, the adhesive film leaves an adhesive on a surface of an article.

As an adhesive film free from such an elapsing variation under a high temperature circumstance, JP-A 4-55488 discloses an adhesive film, which comprises (a) a substrate layer containing a thermoplastic resin, and (b) an adhesive layer containing a polyethylene or ethylene/α-olefin copolymer having a density of not higher than 0.92 g/cm$^2$ and a melt index of from 1 to 20 g/10 min.

Further, JP-A 8-157791 discloses an adhesive film, which comprises (a) an adhesive layer containing an ethylene-α-olefin copolymer having a weight average molecular weight (Mw) of not less than $5 \times 10^4$ a ratio (Mw/Mn) between said average molecular weight (Mw) and a number average molecular weight (Mn) of not more than 3, a melting peak temperature and a melting calorie of not lower than 110° C. and not more than 100 j/g according to a DSC analysis, respectively, and (b) a substrate layer containing another polyolefin resin.

However, these adhesive films have problems that (i) their stickiness is extremely low particularly at a low temperature, and (ii) it is difficult to control their stickiness.

SUMMARY OF THE INVENTION

An object of the present invention is to provide an adhesive film, whose stickiness does not vary extremely with an elapse of time even under a low or high temperature circumstance; whose stickiness can be controlled; whose adhesive property, peeling property, re-adhesive property and re-peeling property are satisfactory; which leaves no adhesive on a surface of an article; and which has a superior valance among its flexibility, heat resistance, low temperature resistance and weatherability.

The present inventors have undertaken extensive studies to develop an adhesive film capable of accomplishing the above-mentioned objects. As a result, it has been found that said objects can be accomplished by using an adhesive layer comprising an olefin polymer having specific physical properties, and thereby the present invention has been obtained.

The present invention provides an adhesive film comprising:

(i) a substrate layer, which comprises a thermoplastic resin, and (ii) an adhesive layer, which comprises an olefin copolymer, wherein the olefin copolymer comprises polymerization units of at least two olefins selected from the group consisting of ethylene and α-olefins having 3 to 20 carbon atoms, and the olefin copolymer satisfies the requirements:

(a) the olefin copolymer has neither a peak of crystal melting enthalpy of not less than 1 J/g, nor a peak of crystallization enthalpy of not less than 1 J/g in a differential scanning calorimetry according to JIS K 7122, and (b) a molecular weight distribution of the olefin copolymer, Mw/Mn, is not more than 3.

DETAILED DESCRIPTION OF THE INVENTION

An olefin copolymer used in the present invention means a copolymer comprising polymerization units of at least two olefins selected from the group consisting of ethylene and α-olefins having 3 to 20 carbon atoms. The olefin polymerization unit is hereinafter called like "olefin unit". The olefin copolymer may contain, if necessary, at least one polymerization unit selected from the group consisting of polyene compound units, cyclic olefin units and vinyl aromatic compound units in addition to the olefin unit.

Examples of the above-mentioned α-olefins having 3 to 20 carbon atoms, polyene compounds, cyclic olefins and vinyl aromatic compounds are as follows.

1. α-Olefin having 3 to 20 Carbon Atoms

As such an α-olefin, linear and branched α-olefins are exemplified. Specific examples of the linear α-olefin are propylene, 1-butene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nanodecene and 1-eicocene. Specific examples of the branched α-olefin are 3-methyl-1-butene, 3-methyl-1-pentene, 4-methyl-1-pentene, 2-ethyl-1-hexene and 2,2,4-trimethyl-1-pentene. Of these, propylene, 1-butene, 1-pentene, 1-hexene, 1-octene, 1-decene, 3-methyl-1-pentene, 3-methyl-1-butene and 4-methyl-1-pentene are preferred.

2. Polyene Compound

As the polyene compound, both a conjugated polyene compound and a non-conjugated polyene compound are preferred. The conjugated polyene compound includes, for example, an aliphatic conjugated polyene compound and an alicyclic conjugated polyene compound. As the aliphatic conjugated polyene compound, a linear aliphatic conjugated polyene compound and a branched aliphatic conjugated polyene compound are exemplified. The aliphatic conjugated polyene compound and the alicyclic conjugated polyene compound may contain a group such as an alkoxy group, an aryl group, an aryloxy group, an aralkyl group and an aralkyloxy group.

Specific examples of the aliphatic conjugated polyene compound are 1,3-butadiene, isoprene, 2-ethyl-1,3- butadiene, 2-propyl-1,3-butadiene, 2-isopropyl-1,3-butadiene, 2-hexyl-1,3-butadiene, 2,3-dimethyl-1,3-butadiene, 2,3-diethyl-1,3-butadiene, 2-chloro-1,3-butadiene, 2,3-dichloro-1,3-butadiene, 1-fluoro-1,3-butadiene, 2-chloro-1,3-pentadiene, 2-methyl-1,3-pentadiene, 2-methyl-1,3-hexadiene, 2-methyl-1,3-octadiene, 2-methyl-1,3-decadiene, 2,3-dimethyl-1,3-pentadiene, 2,3-dimethyl-1,3-hexadiene, 2,3-dimethyl-1,3-octadiene and 2,3-dimethyl-1,3-decadiene.

Specific examples of the alicyclic conjugated polyene compound are 2-methyl-1,3-cyclopentadiene, 2-mehtyl-1,3-cyclohexadiene, 2,3-dimethyl-1,3-cyclopentadiene, 2,3-dimethyl-1,3-cyclohexadiene, 2-chloro-1,3-cyclopentadiene and 2-chloro-1,3-cyclohexadiene.

The non-conjugated polyene compound includes, for example, an aliphatic non-conjugated polyene compound, an alicyclic non-conjugated polyene compound and an aromatic non-conjugated polyene compound. As the aliphatic non-conjugated polyene compound, a linear aliphatic non-conjugated polyene compound and a branched aliphatic non-conjugated polyene compound are exemplified. The aliphatic non-conjugated polyene compound, the alicyclic non-conjugated polyene compound and the aromatic non-conjugated polyene compound may contain a group such as an alkoxy group, an aryl group, an aryloxy group, an aralkyl group and an aralkyloxy group.

Specific examples of the aliphatic non-conjugated polyene compound are 1,4-hexadiene, 1,5-hexadiene, 1,6-heptadiene, 1,6-octadiene, 1,7-octadiene, 1,8-nonadiene, 1,9-decadine, 1,13-tetradecadiene, 1,5,9-decatriene, 3-methyl-1,4-hexadiene, 4-methyl-1,4-hexadiene, 5-methyl-1,4-hexadiene, 4-ethyl-1,4-hexadiene, 3-methyl-1,5-hexadiene, 3,3-dimethyl-1,4-hexadiene, 3,4-dimethyl-1,5-hexadiene, 5-methyl-1,4-heptadiene, 5-ethyl-1,4-heptadiene, 5-methyl-1,5-heptadiene, 6-methyl-1,5-heptadiene, 5-ethyl-1,5-heptadiene, 3-methyl-1,6-heptadiene, 4-methyl-1,6-heptadiene, 4,4-dimethyl-1,6-heptadiene, 4-ethyl-1,6-heptadiene, 4-methyl-1,4-octadiene, 5-methyl-1,4-octadiene, 4-ethyl-1,4-octadiene, 5-ethyl-1,4-octadiene, 5-methyl-1,5-octadiene, 6-methyl-1,5-octadiene, 5-ethyl-1,5-octadiene, 6-ethyl-1,5-octadiene, 6-methyl-1,6-octadiene, 7-methyl-1,6-octadiene, 6-ethyl-1,6-octadiene, 6-propyl-1,6-octadiene, 6-butyl-1,6-octadiene, 4-methyl-1,4-nonadiene, 5-methyl-1,4-nonadiene, 4-ethyl-1,4-nonadiene, 5-ethyl-1,4-nonadiene, 5-methyl-1,5-nonadiene, 6-methyl-1,5-nonadiene, 5-ethyl-1,5-nonadiene, 6-ethyl-1,5-nonadiene, 6-methyl-1,6-nonadiene, 7-methyl-1,6-nonadiene, 6-ethyl-1,6-nonadiene, 7-ethyl-1,6-nonadiene, 7-methyl-1,7-nonadiene, 8-methyl-1,7-nonadiene, 7-ethyl-1,7-nonadiene, 5-methyl-1,4-decadiene, 5-ethyl-1,4-decadiene, 5-methyl-1,5-decadiene, 6-methyl-1,5-decadiene, 5-ethyl-1,5-decadiene, 6-ethyl-1,5-decadiene, 6-methyl-1,6-decadiene, 6-ethyl-1,6-decadiene, 7-methyl-1,6-decadiene, 7-ethyl-1,6-decadiene, 7-methyl-1,7-decadiene, 8-methyl-1,7-decadiene, 7-ethyl-1,7-decadiene, 8-ethyl-1,7-decadiene, 8-methyl-1,8-decadiene, 9-methyl-1,8-decadiene, 8-ethyl-1,8-decadiene, 6-methyl-1,6-undecadiene, 9-methyl-1,8-undecadiene, 6,10-dimethyl-1,5,9-undecatriene, 5,9-dimethyl-1,4,8-decatriene, 4-ethylidene-8-methyl-1,7-nonadiene, 13-ethyl-9-methyl-1,9,12-pentadecatriene, 5,9,13-trimethyl-1,4,8,12-tetradecadiene, 8,14,16-trimethyl-1,7,14-hexadecatriene and 4-ethylidene-12-methyl-1,11-pentadecadiene.

Specific examples of the alicyclic non-conjugated polyene compound are vinylcyclohexene, 5-vinyl-2-norbornene, 5-ethylidene-2-norbornene, 5-methylene-2-norbornene, 5-isopropenyl-2-norbornene, cyclohexadiene, dicyclopentadiene, cyclooctadiene, 2,5-norbornadiene, 2-methyl-2,5-norbornadiene, 2-ethyl-2,5-norbornadiene, 2,3-diisopropylidene-5-norbornene, 2-ethylidene-3-isopropylidene-5-norbornene, 6-chloromethyl-5-isopropenyl-2-norbornene, 1,4-divinylcyclohexane, 1,3-divinylcyclohexane, 1,3-divinylcyclopentane, 1,5-divinylcyclooctane, 1-allyl-4-vinylcyclohexane, 1,4-diallylcyclohexane, 1-allyl-5-vinylcyclooctane, 1,5-diallylcyclooctane, 1-allyl-4-isopropenylcyclohexane, 1-isopropenyl-4-vinylcyclohexane, 1-isopropenyl-3-vinylcyclopentane and methyltetrahydroindene.

Specific examples of the aromatic non-conjugated polyene compound are divinylbenzene and vinylisopropenylbenzene.

3. Cyclic Olefin Compound

Specific examples of the cyclic olefin compound are norbornene, 5-methylnorbornene, 5-ethylnorbornene, 5-propylnorbornene, 5,6-dimethylnorbornene, 1-methylnorbornene, 7-methylnorbornene, 5,5,6-trimethylnorbornene, 5-phenylnorbornene, 5-benzylnorbornene, 5-ethylidenenorbornene, 5-vinylnorbornene, 1,4,5,8-dimethano-1,2,3,4,4a,5,8,8a-octahydronapthalene, 2-methyl-1,4,5,8-dimethano-1,2,3,4,4a,5,8,8a-octahydronapthalene, 2-ethyl-1,4,5,8-dimethano-1,2,3,4,4a,5,8,8a-octahydronapthalene, 2,3-dimethyl-1,4,5,8-dimethano-1,2,3,4,4a,5,8,8a-octahydronapthalene, 2-hexyl-1,4,5,8-dimethano-1,2,3,4,4a,5,8,8a-octahydronapthalene, 2-ethylidene-1,4,5,8-dimethano-1,2,3,4,4a,5,8,8a-octahydronapthalene, 2-fluoro-1,4,5,8-dimethano-1,2,3,4,4a,5,8,8a-octahydronapthalene, 1,5-dimethyl-1,4,5,8-dimethano-1,2,3,4,4a,5,8,8a-octahydronapthalene, 2-cyclohexyl-1,4,5,8-dimethano-1,2,3,4,4a,5,8,8a-octahydronapthalene, 2,3-dichloro-1,4,5,8-dimethano-1,2,3,4,4a,5,8,8a-octahydronapthalene, 2-isobutyl-1,4,5,8-dimethano-1,2,3,4,4a,5,8,8a-octahydronapthalene, 1,2-dihydrodicyclopentadiene, 5-chloronorbornene, 5,5-dichloronorbornene, 5-fluoronorbornene, 5,5,6-trifluoro-6-trifluoromethylnorbornene, 5-chloromethylnorbornene, 5-methoxynorbornene, 5,6-dicarboxylnorbornene anhydrate, 5-dimethylaminonorbornene, 5-cyanonorbornene, cyclopentene, 3-methylcyclopentene, 4-methylcyclopentene, 3,4-dimethylcyclopentene, 3,5-dimethylcyclopenetene, 3-chlorocyclopentene, cyclohexene, 3-methylcyclohexene, 4-methylcyclohexene, 3,4-dimethylcyclohexene, 3-chlorocyclohexene and cycloheptene.

4. Vinyl Aromatic Compound

Specific examples of the vinyl aromatic compound are styrene, α-methylstyrene, p-methylstyrene, vinylxylene, monochlorostyrene, dichlorostyrene, monobromostyrene, dibromostyrene, fluorostyrene, p-tert-butylstyrene, ethylstyrene and vinylnaphthalene.

As an olefin copolymer used in the present invention, the following copolymers 1 to 24 are preferable in order to obtain an adhesive film having a stable stickiness.

1. Olefin polymers obtained by copolymerizing ethylene and at least one α-olefin having 3 to 20 carbon atoms, and if desired, at least one compound selected from the group consisting of the polyene compounds, the cyclic olefin compounds and the vinyl aromatic compounds.

2. Olefin polymers obtained by copolymerizing ethylene and at least one α-olefin having 4 to 20 carbon atoms, and if desired, at least one compound selected from the group consisting of the polyene compounds, the cyclic olefin compounds and the vinyl aromatic compounds.

3. Olefin polymers obtained by copolymerizing ethylene, propylene and at least one α-olefin having 4 to 20 carbon atoms, and if desired, at least one compound selected from the group consisting of the polyene compounds, the cyclic olefin compounds and the vinyl aromatic compounds.

4. Olefin polymers obtained by copolymerizing propylene and at least one α-olefin having 4 to 20 carbon atoms, and if desired, at least one compound selected from the group consisting of the polyene compounds, the cyclic olefin compounds and the vinyl aromatic compounds.

5. Olefin polymers obtained by copolymerizing ethylene and at least one α-olefin having 3 to 20 carbon atoms.

6. Olefin polymers obtained by copolymerizing ethylene, at least one α-olefin having 3 to 20 carbon atoms, and at least one polyene compound.

7. Olefin polymers obtained by copolymerizing ethylene, at least one α-olefin having 3 to 20 carbon atoms, and at least one cyclic olefin compound.

8. Olefin polymers obtained by copolymerizing ethylene, at least one α-olefin having 3 to 20 carbon atoms, and at least one vinyl aromatic compound.

9. Olefin polymers obtained by copolymerizing ethylene, at least one α-olefin having 3 to 20 carbon atoms, at least one polyene compound, and at least one vinyl aromatic compound.

10. Olefin polymers obtained by copolymerizing ethylene and at least one α-olefin having 4 to 20 carbon atoms.

11. Olefin polymers obtained by copolymerizing ethylene, at least one α-olefin having 4 to 20 carbon atoms, and at least one polyene compound.

12. Olefin polymers obtained by copolymerizing ethylene, at least one α-olefin having 4 to 20 carbon atoms, and at least one cyclic olefin compound.

13. Olefin polymers obtained by copolymerizing ethylene, at least one α-olefin having 4 to 20 carbon atoms, and at least one vinyl aromatic compound.

14. Olefin polymers obtained by copolymerizing ethylene, at least one α-olefin having 4 to 20 carbon atoms, at least one polyene compound, and at least one vinyl aromatic compound.

15. Olefin polymers obtained by copolymerizing ethylene, propylene, and at least one α-olefin having 4 to 20 carbon atoms.

16. Olefin polymers obtained by copolymerizing ethylene, propylene, at least one α-olefin having 4 to 20 carbon atoms, and at least one polyene compound.

17. Olefin polymers obtained by copolymerizing ethylene, propylene, at least one α-olefin having 4 to 20 carbon atoms, and at least one cyclic olefin compound.

18. Olefin polymers obtained by copolymerizing ethylene, propylene, at least one α-olefin having 4 to 20 carbon atoms, and at least one vinyl aromatic compound.

19. Olefin polymers obtained by copolymerizing ethylene, propylene, at least one α-olefin having 4 to 20 carbon atoms, at least one polyene compound, and at least one vinyl aromatic compound.

20. Olefin polymers obtained by copolymerizing propylene and at least one α-olefin having 4 to 20 carbon atoms.

21. Olefin polymers obtained by copolymerizing propylene, at least one α-olefin having 4 to 20 carbon atoms, and at least one polyene compound.

22. Olefin polymers obtained by copolymerizing propylene, at least one α-olefin having 4 to 20 carbon atoms, and at least one cyclic olefin compound.

23. Olefin polymers obtained by copolymerizing propylene, at least one α-olefin having 4 to 20 carbon atoms, and at least one vinyl aromatic compound.

24. Olefin polymers obtained by copolymerizing propylene, at least one α-olefin having 4 to 20 carbon atoms, at least one polyene compound, and at least one vinyl aromatic compound.

Among the above-mentioned polymers 1 to 24, the polymers 1, 2 and 3 are preferable from a viewpoint of stability of stickiness of an adhesive film obtained particularly under a low temperature, and the polymers 5, 10, 15 and 20 are preferable from a viewpoint of weatherability.

The olefin copolymer used in the present invention is a copolymer having neither a peak of crystal melting enthalpy of not less than 1 J/g, and preferably not less than 0.5 J/g, nor a peak of crystallization enthalpy of not less than 1 J/g, and preferably not less than 0.5 J/g in a differential scanning calorimetry according to JIS K 7122, from a viewpoint of stability of stickiness of an adhesive film obtained particularly under a low temperature.

A molecular weight distribution (Mw/Mn) of the olefin copolymer used in the present invention is not more than 3, preferably not more than 2.8, and more preferably not more than 2.5, from a viewpoint of stickiness of an adhesive film obtained particularly under a high temperature, and from a viewpoint of prevention of an adhesive from remaining on a surface of an article applied.

An intrinsic viscosity [η] of the olefin copolymer used in the present invention is preferably from 0.5 to 10 dl/g, more preferably from 1.0 to 8.0 dl/g, and much more preferably from 1.3 to 6.0 dl/g, from a viewpoint of stickiness, prevention of an adhesive from remaining on a surface of an article, and stickiness under a high temperature of an adhesive film obtained.

Among the olefin copolymers used in the present invention, an olefin copolymer satisfying a requirement that an X defined by the following formula (1) is not less than 0.020, preferably not less than 0.030, more preferably not less than 0.040, much more preferably not less than 0.050, and particularly preferably not less than 0.060 is preferable, from a viewpoint of flexibility and stability of stickiness of an adhesive film obtained.

$$X=[A(T2M)-A(T2C)/[|(T2A-T2B)|] \tag{1}$$

Further, among the olefin copolymers used in the present invention, an olefin copolymer satisfying a requirement that the X defined by the above formula (1) is not more than 0.400, preferably not more than 0.380, more preferably not more than 0.360, much more preferably not more than 0.340, particularly preferably not more than 0.320, and most preferably not more than 0.300 is preferable from a viewpoint of stability of stickiness and control of stickiness of an adhesive film obtained.

Further, among the olefin copolymers used in the present invention, an olefin copolymer satisfying a requirement that the X defined by the above formula (1) is not more than 0.250, preferably not more than 0.200, and more preferably not more than 0.150 is preferred from a viewpoint of shape retaining property under high temperature and high-tensile elongation characteristics of the adhesive film obtained.

The A (T2M), A (T2C), T2A and T2B are numerical values obtained by using measurement results according to a pulse NMR of (1) the olefin copolymer used in the present invention, (2) one polypropylene resin selected from the group consisting of the following (A) to (C), and (3) a resin composition essentially consisting of said olefin copolymer and one polypropylene resin selected from the group consisting of the following (A) to (C). Herein, as the resin composition in the above item (3), those of ① 20/80, ② 40/60, ③ 60/40 and ④ 80/20 in their weight ratios of "said olefin copolymer/said polypropylene resin" are used. These resin compositions can be prepared by kneading the olefin copolymer and the polypropylene resin with a usual kneading apparatus such as a rubber mill, a Brabender mixer, a Banbury mixer, a press kneader and a twin screw extruder. A kneading temperature is a temperature at which the olefin copolymer and the polypropylene resin are melted, and usually from 160 to 250° C., and preferably from 180 to 240° C. The resin composition obtained is press-molded to a sample having a predetermined thickness according to a process conformed to JIS K 6758:

(A) a propylene polymer, which has a melt flow rate of 12.0±3.0 g/10 mm. at 230° C. under a load of 2.16 kg, and which shows a main peak position (melting point) of 160±3° C. in a crystal melting measured according to JIS K 7121 using a differential scanning calorimeter (DSC), and shows a crystal melting enthalpy of 100±5 J/g measured according to JIS K 7122 using a differential scanning calorimeter (DSC), (B) a propylene-ethylene copolymer, which has a melt flow rate of 3.0±0.5 g/10 min. at 230° C. under a load of 2.16 kg, and which shows a main peak position (melting point) of 145±2° C. in a crystal melting measured according to JIS K 7121 using a differential scanning calorimeter (DSC), and shows a crystal melting enthalpy of 87±5 J/g measured according to JIS K 7122 using a differential scanning calorimeter (DSC), and (C) a propylene-ethylene copolymer, which has a melt flow rate of 1.0 35 0.6 g/10 min. at 230° C. under a load of 2.16 kg, and which shows a main peak position (melting point) of 135±2° C. in a crystal melting measured according to JIS K 7121 using a differential scanning calorimeter (DSC), and shows a crystal melting enthalpy of 60±5 J/g measured according to JIS K 7122 using a differential scanning calorimeter (DSC).

The sample used in the above-mentioned measurement with a differential scanning calorimeter is prepared according to a process prescribed in "Item 3 (2) Adjustment of state of test pieces: In the case where a melting temperature is measured after a pre-determined heat treatment" of JIS K 7121.

The above-mentioned A (T2M) and A (T2C) are values obtained through a definite integration of a curve within a range of Pa=0~1, wherein the curve is obtained in a manner such that respective T2 relaxation times of the olefin copolymer, the polypropylene resin and the resin composition are plotted on the ordinate, and a weight ratio of the olefin copolymer in the resin composition, which is expressed by Pa, is plotted on the abscissa. Here, the A (T2M) is a value calculated from a curve based on a multiple regression equation, which is found from a third regression equation obtained in a manner such that the T2 relaxation times (found value of T2 relaxation time=T2M (Pa)) of the olefin copolymer, the polypropylene resin and the resin compositions different in the weight ratio Pa are plotted on the ordinate; and the A (T2C) is a value calculated from a curve based on a multiple regression equation, which is found from a third regression equation obtained in a manner such that T2 relaxation times (found value of T2 relaxation time=T2C (Pa)) are plotted on the ordinate, which T2 relaxation times are calculated from the following formula (2) using T2A, namely a T2 relaxation time obtained from the pulse NMR measurement of the polypropylene resin, and T2B, namely a T2 relaxation time obtained from the pulse NMR measurement of the olefin copolymer.

The PvA (Pa) in the following formula (2) is a numerical value defined by the following formula (3). The VA and VC (Pa) in the following formula (3) are respective volume ratios of components measured within a range of 70~150 μsec. in their free induction decay (FID) obtained from respective pulse NMR measurements of the polypropylene resin and the resin compositions different in the composition.

$$T2C(Pa)=1/[PvA(Pa)/T2A+(1-PvA(Pa))/T2B] \quad (2)$$

$$PvA(Pa)=VA \times (1-Pa)/VC(Pa) \quad (3)$$

As all of the above T2 relaxation times, values obtained within a range of 70~150 μsec. in their free induction decay (FID) are used.

The T2 relaxation time obtained from the pulse NMR measurement is called a spin-spin relaxation time or a transverse relaxation time. Generally, a free induction decay (FID) occurring after a single 90° pulse decays depending on exp(−t/T2), and from this, T2, namely the T2 relaxation time, can be found. A measurement method of the spin-spin relaxation time by means of pulse NMR is described in, for example, Nishi et al., J. Chem. Phys. 82, 4327 (1985).

In the present invention, since the X in the formula (1) is calculated aiming at a specific portion of the above-mentioned resin composition, a value obtained within a range of 70~150 μsec. in the free induction decay (FID) is used as the T2 relaxation time. That is, a decay time t and a macroscopic magnetization intensity M(t) within a range of 70~150 μsec. are extracted from the obtained free induction decay (FID) data, a relation therebetween is expressed in terms of a linear approximation according to a least-squares method using t as the abscissa and a natural logarithm of M(t), (In (M(t)), as the ordinate, and a reciprocal of an absolute value of inclination of the obtained straight line is assigned to be the T2 relaxation time.

Further, in using the multiple regression equation to calculate both A (T2M) and A (T2C), respective values of six points, 0, 0.2, 0.4, 0.6, 0.8 and 1 are used as the weight ratio Pa of the olefin copolymer in the above-mentioned resin composition.

The PvA (Pa) in the above formula (2) is a volume ratio of the polypropylene resin in the component measured within a range of 70~150 μsec. in the free induction decay (FID) obtained by the pulse NMR measurement of the resin composition, and can be calculated by the above formula (3).

The VA and VC (Pa) in the above formula (3) are respective volume ratios of components measured within a range of 70~150 μsec. in their free induction decay (FID) obtained from respective pulse NMR measurements of the polypropylene resin and the resin compositions different in the composition. Here, a value of VC(Pa) when Pa=0 relates to the polypropylene resin, and VC(0)=VA.

The volume ratios of components measured within a range of 70~150 μsec. in the free induction decay (FID) are calculated from the volume ratios of compositions measured within ① 0~70 μsec., ② 70~150 μsec. and ③ 150 μsec. ~. More specifically, the volume ratios are calculated in a manner such that ① a maximum macroscopic magnetization intensity M(t), (M(t)max),② an M(t) at 70 μsec., (M(70)) and ③ an M(t) at 150 μsec., (M(150)) are extracted from the free induction decay data, and are substituted for a calculation formula, [M(70)−M(150)]/M(t)max.

In the present invention, it is supposed that the component measured within a range of 70~150 μsec. in the free induction decay (FID), which is originated from the polypropylene resin in the above-mentioned resin composition, linearly decreases with decrease of the polypropylene resin component. This is expressed by a numerator, (VA×(1−Pa)), of the right side in the above formula (3). The "volume, PvA(Pa), of the component originated from the polypropylene resin" in the "all components measured within a range of 70~150 μsec. in the free induction decay (FID)" can be obtained from the above formula (3), that is, by dividing the numerator, respective (VA×(1−Pa) of the resin compositions different in the composition, by the denominator, VC(Pa) in each composition.

The T2C(Pa) in the above formula (2) (left side) is a T2 relaxation time (calculated value) of the composition, when it is supposed that "both the component originated from the polypropylene resin in the composition measured within a range of 70~150 μsec. in the free induction decay (FID), and the component originated from the olefin copolymer are in a specific state". In the right side of said formula, PvA (Pa) is a volume ratio originated from the polypropylene resin component; T2A is a T2 relaxation time based on the polypropylene resin component; (1−PvA(Pa)) is a volume ratio originated from the olefin copolymer component; and T2B is a T2 relaxation time based on the olefin copolymer component.

Among the olefin polymers used in the present invention, an olefin copolymer having an elastic recovery defined by the following formula (4) of from 70 to 100%, preferably from 72 to 100%, more preferably from 74 to 100%, much more preferably from 76 to 100%, particularly preferably from 78 to 100%, and most preferably from 80 to 100% is preferred from a viewpoint of stability of stickiness and prevention of an adhesive from remaining on an article of an adhesive film obtained.

Elastic recovery S(%)=stress-residual deformation recovery×100/stretch deformation (4)

In the formula (4), the stress-residual deformation recovery and the stretch deformation are those obtained from a 100% strain hysteresis curve of a resin composition consisting essentially of 70 parts by weight of the olefin copolymer and 30 parts by weight of one polypropylene resin selected from the group consisting of the following (B) and (C), provided that at least one resin composition satisfies the above-defined requirement:

(B) a propylene-ethylene copolymer, which has a melt flow rate of 3.0±0.5 g/10 min. at 230° C. under a load of 2.16kg, and which shows a main peak position (melting point) of 145±2° C. in a crystal melting measured according to JIS K 7121 using a differential scanning calorimeter (DSC), and shows a crystal melting enthalpy of 87±5 J/g measured according to JIS K 7122 using a differential scanning calorimeter (DSC), and (C) a propylene-ethylene copolymer, which has a melt flow rate of 1.0±0.6 g/10 min. at 230° C. under a load of 2.16 kg, and which shows a main peak position (melting point) of 135±2° C. in a crystal melting measured according to JIS K 7121 using a differential scanning calorimeter (DSC), and shows a crystal melting enthalpy of 60±5 J/g measured according to JIS K 7122 using a differential scanning calorimeter (DSC).

The sample used for the above-mentioned measurement using a differential scanning calorimeter is prepared according to a process prescribed in "Item 3 (2) Adjustment of state of test pieces: In the case where a melting temperature is measured after a pre-determined heat treatment" of JIS K 7121.

The elastic recovery (S) means a ratio of a stress-residual deformation recovery to a stretch deformation, which are obtained from a 100% strain hysteresis curve. Regarding the hysteresis curve, a test piece is gradually stretched under a load to a predetermined length to obtain a curve 1 showing a relationship between a load (transverse axis) and an elongation (longitudinal axis); successively, the load is reduced to shrink the test piece to obtain another curve 2 different from the curve 1; and the curve 1 and the curve 2 are referred to as a hysteresis curve, wherein, in the curve 2, the elongation (longitudinal axis) is not 0(zero) even when the load (transverse axis) is 0(zero). A measuring method of the elastic recovery is as follows.

Using a dumbbell shaped No. 1 test piece (gauge length= 40 mm, thickness=0.5 mm) conformed to JIS K6251, and using a testing machine, a trademark of STROGRAPH R, manufactured by Toyo Seiki Co., Ltd., an elastic recovery is measured by a process comprising the steps of:

(i) stretching the test piece at a cross head speed of 200 mm/min. until a stretch deformation reaches 100% (gauge length 80 mm), (ii) reversing the cross head immediately after the stretching, and shrinking the test piece at a cross head speed of 200 mm/min. until the stress reaches 0 (zero) to obtain a chart, (iii) from the chart, reading measures corresponding to the stretch deformation and the stress-residual recovery, respectively, and (iv) repeating the above-mentioned steps with respect to additional two test pieces, and regarding an arithmetic mean of the values obtained as a result of measurement.

As an olefin copolymer used in the present invention, such a copolymer is preferable from a viewpoint of stickiness of an adhesive film obtained, which copolymer satisfies the following formula (5), preferably the following formula (6), more preferably the following formula (7), and particularly preferably the following formula (8).

$$Ua \leq 1.5 \times Sa \times (Ta/100)^{3.3} \quad (5)$$

$$Ua \leq 1.4 \times Sa \times (Ta/100)^{3.3} \quad (6)$$

$$Ua \leq 1.3 \times Sa \times (Ta/100)^{3.3} \quad (7)$$

$$Ua \leq 1.2 \times Sa \times (Ta/100)^{3.3} \quad (8)$$

In the above formulas (5) to (8), (i) Ua(MPa) means a flexural modulus measured according to JIS K 7230 of a resin composition consisting essentially of 50 parts by weight of the olefin copolymer and 50 parts by weight of a homopolypropylene resin, wherein the homopolypropylene resin has a flexural modulus (Sa) of 1400±100 MPa measured according to JIS K 7230, a melt flow rate of 12±3g/10 min. measured at 230° C. under a load of 2.16kg, and a peak position (melting point) of 162±2° C. in a crystal melting measured according to JIS K 7122 with a differential scanning calorimeter (DSC), and (ii) Ta means a content of the homopolypropylene resin contained in the resin composition, namely Ta=50.

Whether or not a certain olefin copolymer satisfies the above formulas (5) to (8) is determined by a method comprising the steps of:

(1) using a propylene homopolymer as the homopolypropylene resin, which has a flexural modulus (Sa) of 1400±100 MPa measured according to JISK7203, a melt flow rate of 12±3g/10 min. measured at 230° C. under a load of 2.16kg, and a peak position (melting point) of 162±2° C. in a crystal melting measured according to JIS K 7122 with a differential scanning calorimeter (DSC) (the homopolypropylene resin may be a commercial one), (2) measuring a flexural modulus (Sa) of the propylene homopolymer according to JIS K 7203, (3) kneading 50 parts by weight of the propylene homopolymer, 50 parts by weight (Ta) of the olefin copolymer, and 0.25 part by weight of IRGANOX 1010 (antioxidant), which is a trademark and manufactured by Ciba Specialty Chemicals, Co., at 200° C. for 2minutes with a batch type closed kneader (for example, a kneader, a trade mark of PLASTI-CORDER PLV 151, manufactured by Brabender OHG) under a screw rotating speed of 10 rpm, and thereafter additionally kneading for 5 minutes under 100 rpm to obtain a resin composition, (4) press-molding the resin composition at 230° C. according to JIS K6758 to obtain three kinds of sheet, (5) measuring a flexural modulus (Ua) of the sheet according to JIS K 7203, (6) substituting the above Sa value and Ta value for the right side of the above formulas (5) to (8) to obtain the respective right side values thereof, (7) comparing the respective right side values with the above Ua value to examine whether or not the olefin copolymer satisfies the above formulas (5) to (8), respectively, and (8) finding that the olefin copolymer corresponds to that used in the present invention, when satisfying the above formulas (5) to (8).

When a resin composition, which is obtained by kneading, similarly to the above-mentioned step (3), 30 parts by weight of the above-mentioned homopolypropylene resin, 70 parts (Ta) by weight of an olefin copolymer, and 0.25 part by weight of the above-mentioned antioxidant, satisfies the above formula (5), such an olefin copolymer is a preferable one.

The olefin copolymer used in the present invention can be produced using a polymerization catalyst known in the art such as a Ziegler Natta catalyst and a single site catalyst (for example, a metallocene catalyst). Of these, preferred are a Ziegler Natta catalyst such as a vanadium compound represented by a general formula, $VO(OR)_n X_{3-a}$, wherein R is a hydrocarbon group, X is a halogen and n is a number satisfying $0 \leq n \leq 3$, and a single site catalyst such as a metallocene catalyst, from a viewpoint of a uniform composition distribution of the olefin copolymer obtained.

For example, JP-A58-19309, JP-A60-35005, JP-A60-35006, JP-A 60-35007, JP-A 60-35008, JP-A 61-130314, JP-A 3-163088, JP-A4-268307, JP-A9-12790, JP-A 9-87313, JP-A 11-193309, JP-A 11-80233 and JP-W 10-508055 disclose metallocene catalysts as the single site catalyst, and, for example, JP-A 10-316710, JP-A 11-100394, JP-A 11-80228, JP-A 11-80227, JP-W 10-513489, JP-A 10-338706 and JP-W 11-71420 disclose non-metallocene complex catalysts.

Of these, metallocene catalysts are generally used. From a viewpoint of flexibility of the olefin copolymer obtained, a preferred metallocene catalyst is a transition metal complex having a $C_1$ symmetric structure, which has at least one cyclopentadiene anionic skeleton, and whose metal belongs to any of the groups 3 to 12 of the periodic table. As one of examples of a suitable process for producing a high molecular weight olefin copolymer using a metallocene catalyst, a process disclosed in JP-A 11-206054 can be given.

The olefin copolymer used in the present invention may be used in combination with other thermoplastic resins to form a thermoplastic resin composition. The thermoplastic resin may be a known one. Examples of the thermoplastic resin are polypropylene resins; polyethylene resins such as high density polyethylene, medium density polyethylene, low density polyethylene and linear low density polyethylene (LLDPE); ethylene-acrylic acid copolymer resins; ethylene-vinyl acetate copolymer resins; ethylene-methacrylic acid copolymer resins; polybutene resins; poly-4-methyl-pentene-1 resins; polystyrene resins; polyester resins; polyamide resins; polyphenylene ether resins; polyphenylene oxide resins; polyacetal resins; and polycarbonate resins. Of these, preferred are polyolefin resins such as polypropylene resins and polyethylene resins, more preferred are polyolefin resins having a polymerization unit of an aliphatic olefin having 2 or more carbon atoms as a main unit, and much more preferred are crystalline polyethylene resins and crystalline polypropylene resins.

As an index of crystallinity in the above-mentioned crystalline polyethylene resins and crystalline polypropylene resins, physical properties such as a melting point and a crystal melting enthalpy are used. A melting point thereof is preferably from 80 to 176° C., and more preferably from 90 to 176° C., from a viewpoint of stickiness under a high temperature and prevention of an adhesive from remaining on an article of an adhesive film obtained. From the same viewpoint, a crystal melting enthalpy thereof is preferably from 30 to 120 J/g, and more preferably from 60 to 120 J/g.

From a viewpoint of stickiness and prevention of an adhesive from remaining on an article of an adhesive film obtained, an elongation at break of the above-mentioned thermoplastic resin composition measured according to JISK6251 satisfies preferably the following formula (9), more preferably the following formula (10), much more preferably the following formula (11), and particularly preferably the following formula (12).

$$EB①  \geq EB② - 30 \qquad (9)$$

$$EB① \geq EB② - 20 \qquad (10)$$

$$EB① \geq EB② - 10 \qquad (11)$$

$$EB① \geq EB② \qquad (12)$$

In the above formulas, EB① is an elongation at break (%) of a thermoplastic resin composition comprising 70% by weight of the olefin copolymer and 30% by weight of the thermoplastic resin, and EB② is an elongation at break (%) of a thermoplastic resin composition comprising 30% by weight of the olefin copolymer and 70% by weight of the thermoplastic resin. The elongation at break (%) is measured at a tensile speed of 200 mm/min. using a dumbbell shaped No.3 test piece.

In the case that the adhesive layer comprises the above-mentioned thermoplastic resin composition, a blending ratio of the olefin copolymer and the thermoplastic resin is not particularly limited. The blending ratio by weight of olefin copolymer/thermoplastic resin is preferably from 95/5 to 1/99, more preferably from 90/10 to 3/97, and particularly preferably from 80/20 to 5/95, from a viewpoint of flexibility and heat resistance of the adhesive layer. Stickiness of the adhesive layer can be controlled by the blending ratio of the thermoplastic resin. The stickiness can be particularly successfully controlled when a crystalline polyolefin resin is used as the thermoplastic resin. The stickiness decreases with increase of the blending ratio of the crystalline polyolefin resin, and thereby an adhesive film having a weak adhesion can be obtained.

If desired, the olefin copolymer used in the present invention may be used in combination with a known elastomer other than the olefin copolymer. Examples of the elastomer are an ethylene/α-olefin copolymer rubber; an ethylene/α-olefin/polyene copolymer rubber; block copolymers comprising a polymer block having a vinyl aromatic compound unit as a main unit and another polymer block having a conjugated diene compound unit as a main unit; and hydrogenation products thereof.

Specific examples of the above-mentioned elastomer are styrene-butadiene-styrene block copolymers (SBS), styrene-isoprene-styrene block copolymers (SIS), hydrogenated styrene-isoprene-styrene block copolymers (SEPS), hydrogenated styrene-butadiene-styrene block copolymers (SEBS), natural rubber, polybutadiene, liquid polybutadiene, polyacrylonitrile rubber, acrylonitrile-butadiene copolymer rubber, partially hydrogenated acrylonitrile-butadiene copolymer rubber, butyl rubber, chloroprene rubber, fluororubber, chlorosulfonated polyethylene, silicone rubber, urethane rubber, isobutylene-isoprene copolymer rubber and halogenated isobutylene-isoprene copolymer rubber.

If desired, each of the olefin copolymer and the above-mentioned thermoplastic resin composition comprising the olefin copolymer and the thermoplastic resin, which are used for the adhesive layer, may be subjected to cross-linking such as sulfur cross-linking, peroxide cross-linking, metal ion cross-linking, silane cross-linking and resin cross-linking according to a conventional process using a cross-linking agent, which is a general process in cross-linking of rubber. Examples of the cross-linking agent are sulfur, phenol resins, metal oxides, metal hydroxides, metal chlorides, p-quinone dioxime and bismaleimide cross-liking agents. The cross-linking agent can be used in combination with a cross-linking accelerator to control a cross-linking speed. Examples of the cross-linking accelerator are oxidizing agents such as minium and dibenzothiazoyl sulfide. The cross-linking agent can be used in combination with a dispersing agent such as metal oxides and stearic acid. Examples of the metal oxides are zinc oxide, magnesium oxide, lead oxide and calcium oxide. Of these, preferred are zinc oxide and magnesium oxide. The above-mentioned thermoplastic resin composition comprising the olefin copolymer and the thermoplastic resin may be subjected to dynamic cross-linking in the presence of the cross-linking agent.

A process for producing the above-mentioned thermoplastic resin composition comprising the olefin copolymer and the thermoplastic resin is not limited. There can be exemplified a process comprising the step of kneading respective components with a conventional kneading apparatus such as a rubber mill, a Brabender mixer, a Banbury mixer, a press kneader and a twin screw extruder. The kneading apparatus may be any of a closed type or an open type, and is preferably a closed type apparatus capable of being purged with an inert gas. A kneading temperature is usually from 120 to 250° C., and preferably from 140 to 240° C. A kneading time varies depending upon kinds and amounts of the components used and the kneading apparatus, and is usually from about 3 to about 10 minutes, when a kneading apparatus such as a press kneader and a Banbury mixer is used. In the kneading step, a one-stage kneading step may be applied wherein respective components are kneaded in a lump, or a multi-stage kneading step maybe applied wherein apart of respective components is kneaded, and thereafter the remaining is added thereto to continue the kneading.

If desired, the olefin copolymer used in the present invention may be used in combination with other resins such as rosin resins, polyterpene resins, synthetic petroleum resins, cumarone resins, phenol resins, xylene resins, styrene resins and isoprene resins.

The above-mentioned rosin resins include, for example, natural rosin, polymerized rosin, partially hydrogenated rosin, completely hydrogenated rosin, esterified products of these rosin (such as glycerol esters, pentaerithritol esters, ethylene glycol esters and methyl esters), and rosin derivatives (such as disproportionation rosin, fumaric acid-modified rosin and lime-modified rosin).

The above-mentioned polyterpene resins include, for example, cyclic terpene homopolymers such as α-pinene, β-pinene and dipentene; said cyclic terpene copolymers; copolymers of said cyclic terpene and phenol compounds such as phenol and bisphenol (for example, α-pinene-phenol resin, dipentene-phenol resin and terpene-bisphenol resin); and aromatic-modified terpene resins such as copolymers of said cyclic terpene and an aromatic monomer.

The above-mentioned synthetic petroleum resins include, for example, homopolymers and copolymers of $C_5$ fraction, $C_6$ to $C_{11}$ fractions and other olefin fractions of naphtha cracked oil; hydrogenated products of said homopolymers and copolymers, namely, aliphatic petroleum resins; aromatic petroleum resins; alicyclic petroleum resins; and aliphatic-alicyclic copolymer resins. The synthetic petroleum resins further include, for example, copolymer petroleum resins such as copolymers of the above naphtha cracked oil and the above terpene and hydrogenated products thereof.

Preferred examples of the $C_5$ fraction of the above-mentioned naphtha cracked oil are methylbutenes such as isoprene, cyclopentadiene, 1,3-pentadiene, 2-methyl-1-butene and 2-methyl-2-butene; pentenes such as 1-pentene and 2-pentene; and dicyclopentadiene. Preferred examples of the $C_6$ to $C_{11}$ fractions are methylstyrenes such as indene, styrene, o-vinyltoluene, m-vinyltoluene, p-vinyltoluene, α-methylstyrene and β-methylstyrene; methylindene; ethylindene; vinylxylene and propenylbenzene. Preferred examples of other olefin fractions are butene, hexene, heptene, octene, butadiene and octadiene.

The above-mentioned phenol resins include, for example, alkylphenol resins, alkylphenol-acetylene resins obtained by condenstion between an alkylphenol and acetylene and modified products of such resins. Incidentally, it is permitted to use either a novolak resin obtained by methylolation of phenol with an acid catalyst or a resol resin obtained by methylolation with an alkaline catalyst.

The above-mentioned xylene resins include, for example, xylene-formaldehyde resins obtained from m-xylene and formaldehyde and modified resins thereof obtained by reaction with a third component.

The above-mentioned styrene resins include, for example, lower molecular weight products of styrene, copolymer resins of α-methylstyrene and vinyltoluene and copolymer resins of styrene, acrilonitrile and indene.

The above-mentioned isoprene resins include, for example, dimers of isoprene, i.e. resins obtained by copolymerization of a $C_{10}$ alicyclic compound and a $C_{10}$ chain compound.

Also, the olefin copolymer used in the present invention may be used, if necessary, in combination with stabilizers such as age resistors, antioxidants, antiozonants, ultraviolet ray absorbers and light fastness agents; additives such as antistatic agents, slip agents, internal parting agents, colorants, dispersants, anti-blocking agents, lubricants and anti-fogging agents; fillers such as glass fiber, carbon fiber, metal fiber, glass beads, asbestos, mica, calcium carbonate, potassium titanate whiskers, talc, aramide fiber, barium sulfate, glass flakes and fluororesins; and mineral oil softeners such as naphthene oil and paraffin mineral oil.

Additionally, the olefin copolymer used in the present invention maybe used, if necessary, in combination with a flame retarder. Examples of the flame retarder are inorganic compounds such as antimony flame retaders, aluminum hydroxide, magnesium hydroxide, zinc borate, guanidine flame retarders and zirconium flame retarders; phosphates and phosphorus compounds such as ammonium polyphosphate, ethylenebistris(2-cyanoethyl)phosphonium chloride, tris(tribromophenyl)phosphate, and tris(3-hydroxypropyl)phosphinoxide; chlorine-containing flame retarders such as chlorinated paraffin, chlorinated polyolefin and perchlorocyclopentadecane; and bromine containing flame retarders such as hexabromobenzene, ethylene-bisdibromonorbornane-dicarboxyimide, ethylene-bistetrabromophthalimide, tetrabromobisphenol-A derivatives, tetrabromobisphenol S and tetrabromodipentaerythritol. These flame retarders may be used each alone or in a mixture of two or more.

Additionally, the olefin copolymer used in the present invention may be, if necessary, a foamed article obtained in combination with a foaming agent. Examples of the foaming agent are inorganic foaming agents such as sodium bicarbonate, ammonium bicarbonate and ammonium carbonate; nitroso compounds such as N,N'-dinitrosopentamethylenetetramine; azo compounds such as azocarbonamide and azoisobutylonitrile; and sulfonylhydrazides such as benzenesulfonylhydrazine, p,p'-oxybis(benzenesulfonylhydrazide), toluenesulfonylhydrazide and toluenesulfonylhydrazide derivatives. It is permitted to use the foaming agent in combination with a foaming coagent such as salicylic acid, urea and urea derivatives.

The olefin copolymer and thermoplastic resin use in the present invention may be used in combination with a high frequency processing coagent such as a polar polymer. As the high frequency processing coagent, a copolymer of ethylene and at least one comonomer is exemplified. Examples of such a comonomer are monocarboxylic acids such as acrylic acid, methacrylic acid, ethacrylic acid and crotonic acid; dicarboxylic acids such as maleic acid, fumaric acid, itaconic acid and citraconic acid; monoesters of said dicarboxylic acid; methacrylates such as methyl methacrylate; acrylates such as methyl acrylate and ethyl acrylate; vinyl esters of saturated carboxylic acids such as vinyl acetate and vinyl propionate; and ionomers of these acids or esters.

If desired, the olefin copolymer used in the present invention may be used in combination with a tackifier. Examples of the tackifier are natural rosin resins such as rosin and dammar; modified rosin and derivatives thereof; terpene resins and modified products thereof; and resins such as aliphatic hydrocarbon resins, aromatic hydrocarbon resins, alkylphenol resins and cumarone indene resins. Of these, preferred are terpenes such as terpene phenol and α-polyterpene. Specific examples of the terpenes are YS RESIN TO-105 and CLEARON, which are trade names of commercial products of Yasuhara Chemical Co.,Ltd., and ARKON, ESTER GUM and PENSEL, which are trade names of commercial products of Arakawa Chemical Industries, Ltd.

Examples of a thermoplastic resin used for the substrate layer are polypropylene resins such as crystalline polypropylene, propylene homopolymers and random and block copolymers of propylene and a small amount of an α-olefin; polyethylene resins such as low density polyethylene, medium density polyethylene, high density polyethylene and linear low density polyethylene; poly-4-methyl-pentene; ethylene-α-olefin copolymers; propylene-α-olefin copolymers having an α-olefin unit as a main unit; ethylene-ethyl acrylate copolymers; ethylene-vinyl acetate copolymers; ethylene-methyl methacrylate copolymers; ethylene-n-butyl acrylate copolymers; and a combination thereof. Of these, polyethylene resins and polypropylene resins, which have a good compatibility with the olefin copolymer used in the present invention, are preferred from a viewpoint of obtaining an adhesive film superior in its adhesion and peeling property. As the thermoplastic resin for the substrate layer, it is preferred to use a polymer similar in kind to the olefin copolymer used for the adhesive layer, from a viewpoint of obtaining an adhesive film, whose substrate layer and adhesive layer are difficult to separate from each other, and from a viewpoint of recycling of the adhesive film.

The substrate layer may be a single layer or a multiple layer having at least two layers. A surface of the substrate layer may be treated according to a well-known surface treatment such as a corona discharge treatment, a plasma treatment, a flame treatment, an electronic beam irradiation treatment and an ultraviolet irradiation treatment. The substrate layer may be a colorless transparent layer or a colored or printed layer.

The adhesive film in accordance with the present invention may have one adhesive layer on one side of the substrate layer, or may have two respective adhesive layers on both sides of the substrate layer.

The adhesive film in accordance with the present invention can be produced, for example, according to a process comprising the step of co-extruding or extrusion coating the substrate layer and the adhesive layer using an apparatus such as an apparatus for tubular film production and an apparatus for T die film production, which process may be called an extrusion laminating process.

If desired, the substrate layer may be oriented in a uniaxial or biaxial direction. A preferred process for the uniaxial orientation includes, for example, a roller orientation process conventionally used. A process for the biaxial orientation includes, for example, a successive orientation process comprising carrying out a uniaxial orientation, followed by a biaxial orientation, and a simultaneous biaxial orientation process such as a tubular orientation process.

A thickness of the adhesive film in accordance with the present invention is not particularly limited, and is preferably from about 0.001 to about 5 mm, and more preferably from about 0.005 to about 2 mm. An each thickness of the substrate layer and the adhesive layer may be determined depending upon a kind of an article applied, and physical properties required for the adhesive film such as, for example, adhesion strength.

When producing a roll of an adhesive film by winding continuously the adhesive film in accordance with the present invention, it is permitted to put a liner between the adhesive films, or coat an anti-block additive on the backside of the substrate layer, from a viewpoint of facility of unwinding the adhesive film from the roll, in other words, from a viewpoint of self-peeling property of the adhesive film. The anti-block additive includes silicone anti-block additives and non-silicone anti-block additives. Specific examples of the silicone anti-block additive are anti-block additives of thermosetting silicones, anti-block additives of photo-curable silicones, anti-block additives of silicone-other polymer copolymers and anti-block additives of silicone-other polymer blends. Specific examples of the non-silicone anti-block additives are those containing long chain alkyl polymers, polyolefin or fluorine compounds as a main component.

If desired, the thermoplastic resin used for the substrate layer may be used in combination with an additive such as a release agent in order to give a function such as sliding property to a surface of the substrate layer.

The adhesive film in accordance with the present invention can be suitably used, for example, in electronics fields including a backgound tape used for a semiconductor wafer, a dicing tape, a protecting film for transportation of electronic parts and a protecting film for printed boards; car fields including a window-protecting film, a baked finish film, a guard film for protecting cars until handing over to a user, a marking film for indication use, a marking film for decoration use and a sponge tape for cushioning, protecting, heat-insulating and soundproofing uses; medical and hygienic material fields including a sticking plaster and an endermic plaster; and housing and construction fields including an adhesive or protecting film for electric-insulating use, identification use, duct construction use, window-protecting use, aging use, wrapping use, packing use, business use, household use, fixing use, bundling use and repairing use.

The adhesive film in accordance with the present invention can be particularly suitably used for protecting surfaces of synthetic resin boards, stainless steel boards (which are used, for example, as building materials), aluminum plates, decorative polywood, steal boards, glass boards, household electric appliances, precision instruments and car bodies under fabrication; for inhibiting any scratch of articles which are on the way of stacking, storing or transporting; and for inhibiting any scratch of articles which are subjected to fabrication such as a bending finish and a pressing finish.

EXAMPLE

The present invention is explained in more detail with reference to Examples, which are only illustrative and not limitative.

Physical properties of the olefin copolymers were measured as follows.

1. Composition Analysis of Olefin Copolymer

According to a qualitative analysis of IR analysis, a rolling vibration due to the methylene group of the ethylene unit, that due to the methyl group of the propylene unit, and that due to the methyl group in the ethyl group of the 1-butene unit were observed at 720 cm$^{-1}$, 1154 cm$^{-1}$ and 770 cm$^{-1}$, respectively. Based on the observation results, the obtained copolymer was confirmed to have the ethylene, propylene and 1-butene units.

With respect to a quantitative analysis, using an apparatus, a trademark of AC-250, manufactured by Bruker Co., the following steps (i) and (ii) were carried out to find the composition.

(i) Firstly, a composition ratio of the propylene unit to the 1-butene unit is calculated from a ratio of a spectral strength of carbon due to the methyl group in the propylene unit to that due to the methyl group in the 1-butene unit, both strength being found in $^{13}$CNMR spectra.

(ii) Secondly, a composition ratio of the ethylene, propylene and 1-butene units is calculated from a ratio of a spectral strength of hydrogen due to the methine group and the methylene group to that due to the methyl group, both strength being found in $^1$HNMR spectra.

2. Melting Temperature of Crystal (° C.), Crystal Melting Enthalpy (mj/mg), Crystallization Temperature (° C.) and Crystallization E nthalpy (mj/mg)

Measurement was carried out using a differential scanning calorimeter, a trademark of DSC 220C, manufactured by Seiko Instruments Inc., at temperature raising and descending rates of 10° C./min.

3. Molecular Weight Distribution (Mw/Mn)

Using a solution obtained by dissolving about 5 mg of a sample in 5 ml of o-dichlorobenzene, it was measured according to a gel permeation chromatography (GPC) under conditions as described below.

(i) As a GPC apparatus, an apparatus, a trademark of 150C/GPC, manufactured by Waters Co., was used.

(ii) As a column, a column, a trademark of SODEX PACKED COLUMN A-80M, manufactured by Showa Denko K. K. was used.

(iii) 400 Micro-litters of the above-mentioned solution was injected.

(iv) An elution temperature was adjusted to 140° C.

(v) A flow rate of the solution eluted was controlled to 1.0 ml/min.

(vi) As a detector, a refractivity detector was used.

(vii) As a molecular weight standard reference material, polystyrene of molecular weights of 68–8,400,000, manufactured by Tosoh Corporation was used.

(viii) From a weight average molecular weight (Mw) and a number average molecular weight (Mn) of the sample, each of which average molecular weights was obtained as a converted molecular weight in terms of the molecular weight of the above-mentioned polystyrene, a molecular weight distribution (Mw/Mn) was calculated.

4. Intrinsic Viscosity [η] (dl/g)

It was measured according to a process comprising the steps of:

(i) dissolving 300 milligrams of a sample in 100 ml of tetralin to obtain a solution, (ii) diluting the solution to ½, ⅓ and ⅕, (iii) measuring the diluted solution three times in an oil bath at a constant temperature of 135° C. (±0.1° C.) using Ubbelohde viscometer to find their viscosity, and (iv) regarding an average value thereof as its intrinsic viscosity [η].

Physical properties of the adhesive films were measured as follows.

1. Peel Strength

It was measured according to a process comprising the steps of:

(1) applying the adhesive film to an acrylic plate, (2) pressing it with a roller covered with rubber of 5 Kg in its weight, (3) leaving it at 23° C. for 30 minutes, (4) measuring strength required for peeling the adhesive film from the acrylic plate under conditions of a peel width of 25 mm, a peel angle of 180° and a peel speed of 300 mm/min, and regarding the strength as a peel strength (g/25 mm) at 23° C., and (5) repeating the above-mentioned process except that the temperatures in the above steps (3) and (4) were changed to −20° C., respectively, and measuring a peel strength (g/25 mm) at −20° C.

2. Peel Strength Variation

It was measured according to a process comprising the steps of:

(1) applying the adhesive film to an acrylic plate, (2) pressing it with a roller covered with rubber of 5 Kg in its weight, (3) leaving it at 40° C. for 75 hours in a hot air-circulating oven, and
(4) taking it out from the oven,
(5) leaving it in an atmosphere of 23° C. until a temperature of the acrylic plate lowers to 23° C., and
(6) measuring strength required for peeling the adhesive film from the acrylic plate under conditions of a peel width of 25 mm, a peel angle of 180° and a peel speed of 300 mm/min., and regarding the strength as a peel strength variation (g/25 mm).

3. Adhesive Residue

After completion of the above-mentioned measurement of peel strength variation, the surface of the acrylic plate was visually observed. A case where any adhesive residue (cloud) caused by the adhesive was not observed was marked with ○, and a case where the adhesive residue was observed was marked with X.

Reference Example 1 (Production of Olefin Copolymer A)

Propylene and 1-butene were copolymerized at 34° C. as follows using hydrogen as a molecular weight regulator by circulating cool water in a jacket provided to an outside of a 100 litter stainless steel polymerization reactor equipped with a stirrer.

From a lower part of the reactor, 83 l/hour of hexane (solvent), 12 kg/hour of propylene, 1.3 kg/hour of 1-butene, 0.005 g/hour of dimethylsilyl(tetramethylpentadienyl)(3-tert-butyl-5-methyl-2-phenoxy)titanium dichloride represented by the following formula, 0.260 g/hour of triphenylmethyltetraxis(pentafluorophenyl) borate and 1.654 g/hour of triisobutylaluminum were continuously fed therein, while continuously taking out a polymerization reaction mixture from an upper part of the reactor at a speed at which a polymerization reaction mixture in the reactor could be kept to 100 l.

To the polymerization reaction mixture taken out from the reactor, a small amount of ethanol was added to stop the polymerization reaction, and thereafter, de-monomer and water-washing were carried out. Successively, the solvent was removed in a large amount of water using steam, thereby taking out a copolymer, which was vacuum-dried day and night at 80° C. A propylene-1-butene copolymer (hereinafter referred to as "olefin copolymer A") was obtained at a rate of 2.9 kg/hour. Physical properties of the olefin copolymer A are shown in Table

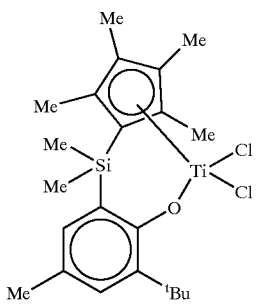

Reference Example 2 (Production of Olefin Copolymer B)

Copolymerization of ethylene, propylene and 1-butene was carried out in the same manner as in Reference Example 1, except that 83 l/hour of hexane (solvent), 6.1 kg/hour of ethylene, 1.9 kg/hour of propylene, 17.1 kg/hour of 1-butene, 0.005 g/hour of dimethylsilyl(tetramethylpentadienyl)(3-tert-butyl-5-methyl-2-phenoxy)titanium dichloride, 0.297 g/hour of triphenylmethyltetraxis(pentafluorophenyl) borate and 3.307 g/hour of triisobutylaluminum were continuously fed in the reactor from a lower part thereof, and the polymerization was carried out at 53° C., thereby obtaining an ethylene-propylene-1-butene copolymer (hereinafter referred to as "olefin copolymer B") at a rate of 3.7 kg/hour. Physical properties of the olefin copolymer B are shown in Table 1.

Reference Example 3 (Production of Olefin Copolymer C)

Copolymerization of ethylene and propylene was carried out in the same manner as in Reference Example 1, except that 83 l/hour of hexane (solvent), 3.5 kg/hour of ethylene, 17.3 kg/hour of propylene, 2.22 g/hour of $VO(OC_2H_5)_2Cl$, and 7.79 g/hour of ethylaluminum sesquichloride were continuously fed in the reactor from a lower part thereof, and the polymerization was carried out at 38° C., thereby obtaining an ethylene-propylene copolymer (hereinafter referred to as "olefin copolymer C") at a rate of 4.1 kg/hour. Physical properties of the olefin copolymer C are shown in Table 1.

Example 1

The olefin copolymer A for an adhesive layer use and a polypropylene resin (MI at 23° C. under 2.16 kg load=2.5 g/10 min.; a commercial name of EXCELLEN EPX KS37G1, manufactured by Sumitomo Chemical Co., Ltd.) for a substrate layer use were molded to obtain respective sheets having thickness of 100 μm. Both sheets were laminated with each other, and the obtained laminate was heated in an oven at 200° C. to perform melt-adhesion, thereby obtaining an adhesive sheet. Physical properties of the adhesive sheet are shown in Table 2.

Example 2

70 Parts by weight of the olefin copolymer A and 30 parts by weight of a polypropylene resin (MI at 230° C. under 2.16 kg load=1.5 g/10 min.; a commercial name of NOBLENE S131, manufactured by Sumitomo Chemical Co., Ltd.) were pre-kneaded at 200° C. for 2 minutes at a screw rotating speed of 10 rpm with a kneading machine, a commercial name of PLASTI-CORDER PLV TYPE 151, manufactured by Brabender OHG, and were additionally kneaded at 200° C. for 10 minutes at a screw rotating speed of 80 rpm with the kneading machine, thereby obtaining an adhesive. Example 1 was repeated to obtain an adhesive sheet, except that the above-obtained adhesive was used for an adhesive layer. Physical properties of the adhesive sheet are shown in Table 2.

Example 3

Example 1 was repeated to obtain an adhesive sheet, except that the olefin copolymer C was used for an adhesive layer, a polyethylene resin (MI at 190° C. under 2.16 kg load=2 g/10 min.; a commercial name of SUMIKATHENE F200, manufactured by Sumitomo Chemical Co., Ltd.) was used for a substrate layer, and the temperature of the oven was changed to 180° C. Physical properties of the adhesive sheet are shown in Table 2.

Example 4

70 Parts by weight of the olefin copolymer B and 30 parts by weight of EXCELLEN EPX KS37G1 were pre-kneaded at 200° C. for 2 minutes at a screw rotating speed of 10 rpm with a kneading machine, a commercial name of PLASTI-CORDER PLV TYPE 151, manufactured by Brabender OHG, and were additionally kneaded at 200° C. for 10 minutes at a screw rotating speed of 80 rpm with the kneading machine, thereby obtaining an adhesive. The resulting adhesive for an adhesive layer use and a polyethylene resin (MFR at 190° C. under 2.16 kg load=2 g/10 min.; a commercial name of SUMIKATHENE CE2575, manufactured by Sumitomo Chemical Co., Ltd.) for a substrate layer use were formed into a laminated film using a tubular film molding machine manufactured by Placo Co., Ltd. under the following conditions, thereby obtaining an adhesive film. Total thickness of the adhesive film and a ratio of "thickness of adhesive layer/thickness of substrate layer" were 50 μm and ¼, respectively. Physical properties of the adhesive film are shown in Table 2.

The adhesive was extruded at 190° C. with an extruder of Ø=50 mm and L/D=28; the resin for the substrate layer use was extruded at 190° C. with an extruder of Ø=50 mm and L/D=28; both extrusion products were supplied to a multiple inflation die of die diameter Ø=150 mm, die lip=1.2 mm, and dies temperature=190° C.; and a tubular film molding was carried out at a blow ratio=1.8 and a drawing speed=10 m/min. so as to laminate the adhesive layer on one side surface of the substrate layer.

Example 5

Example 4 was repeated to obtain an adhesive film, except that 60 parts by weight of the olefin copolymer B and 40 parts by weight of EXCELLEN EPX KS37G1 were used. Physical properties of the adhesive film are shown in Table 2.

Example 6

Example 4 was repeated to obtain an adhesive film, except that 50 parts by weight of the olefin copolymer B and 50 parts by weight of EXCELLEN EPX KS37G11were used. Physical properties of the adhesive film are as shown in Table 2.

Comparative Example 1

Example 1 was repeated to obtain an adhesive sheet, except that an ethylene-octene copolymer ([η]=1.0 dl/g, Mw/Mn=2.3, melting point=98° C., and melting calorie=86 J/g; a commercial name of AFFINITY PF1140, manufactured by Dow Co.) and SUMIKATHENE F200 were used for an adhesive layer and a substrate layer, respectively, and the temperature of the oven was changed to 180° C. Physical properties of the adhesive sheet are shown in Table 3.

Comparative Example 2

The same procedure as in Example 4 was carried out to obtain an adhesive, except that 70 parts by weight of an ethylene-propylene copolymer ([η]=1.7 dl/g, Mw/Mn=3.6; a commercial name of ESPRENE 201, manufactured by Sumitomo Chemical Co., Ltd.) and 30 parts by weight of SUMIKATHENE F200 were used and the kneading was carried out at 180° C. Using the adhesive for an adhesive layer and SUMIKATHENE F200 for a substrate layer, the same procedure as in Example 4 was carried out to obtain an adhesive film. Physical properties of the adhesive film are shown in Table 3.

TABLE 1

| | Olefin copolymer | | |
|---|---|---|---|
| | A | B | C |
| Ethylene unit content (mol %) | 0 | 56 | 55 |
| Propylene unit content (mol %) | 96 | 8 | 45 |
| 1-Butene unit content (mol %) | 4 | 36 | 0 |
| Melting temperature of crystal (° C.) | ND | ND | ND |
| Crystal melting enthalpy (mj/mg) | ND | ND | ND |
| Crystallization temperature (° C.) | ND | ND | ND |
| Crystallization enthalpy (mj/mg) | ND | ND | ND |
| Glass transition temperature (° C.) | −9 | −61 | −57 |
| Intrinsic viscosity [η](dl/g) | 2.3 | 1.3 | 3.6 |
| Mw/Mn | 2.1 | 2.0 | 2.0 |

In Table 1, "ND" means "non-detected".

TABLE 2

| | Example | | | | | |
|---|---|---|---|---|---|---|
| | 1 | 2 | 3 | 4 | 5 | 6 |
| Peal strength (g/25 mm) | | | | | | |
| 23° C. | 530 | 30 | 25 | 250 | 65 | 40 |
| −20° C. | 1000 | 30 | 30 | 180 | 150 | 70 |
| Peel strength variation (g/25 mm) | 500 | 50 | 25 | 230 | 120 | — |
| Adhesive residue | ◯ | ◯ | ◯ | ◯ | ◯ | — |

TABLE 3

| | Comparative Example | |
|---|---|---|
| | 1 | 2 |
| Peal strength (g/25 mm) | | |
| 23° C. | 2 | 50 |
| −20° C. | 0 | 80 |
| Peel strength variation (g/25 mm) | — | 180 |
| Adhesive residue | — | X |

What is claimed is:

1. An adhesive film comprising:
   (i) a substrate layer, which comprises a thermoplastic resin, and
   (ii) an adhesive layer, which comprises an olefin copolymer, wherein the olefin copolymer comprises polymerization units of at least two olefins selected from the group consisting of ethylene and α-olefins having 3 to 20 carbon atoms, and the olefin copolymer satisfies the requirements:
   (a) the olefin copolymer has neither a peak of crystal melting-enthalpy greater than 1 J/g, nor a peak of crystallization enthalpy greater than 1 J/g in a differential scanning calorimetry, and
   (b) a molecular weight distribution of the olefin copolymer, Mw/Mn, is not more than 3.

2. The adhesive film according to claim 1, wherein an intrinsic viscosity [η] of the olefin copolymer is from 0.5 to 10 dl/g.

3. The adhesive film according to claim 1, wherein the olefin copolymer satisfies a requirement that an X defined by the following formula (1) is not less than 0.020, wherein $$X = [A(T2M) - A(T2C)/[(T2A - T2B)]] \quad (1)$$

(1) T2A is a T2 relaxation time obtained from a pulse NMR measurement of one polypropylene resin selected from the group consisting of the following (A) to (C);

(2) T2B is a T2 relaxation time obtained from a pulse NMR measurement of the olefin copolymer;

(3) A(T2M) is a value obtained through a definite integration of a curve based on a third regression equation within a range of Pa=0~1, wherein the curve is obtained in a manner such that respective T2 relaxation times of the olefin copolymer, the above-defined polypropylene resin and a resin composition comprising the olefin copolymer and said polypropylene resin are plotted on the ordinate, and a weight ratio (Pa) of the olefin copolymer in the resin composition is plotted on the abscissa; and (4) A(T2C) is a value obtained through a definite integration of a curve based on a third regression equation within a range of Pa=0~1, wherein the curve is obtained in a manner such that respective T2 relaxation times expressed by T2C (Pa), which is found from the following formula (2) using the T2A and T2B, are plotted on the ordinate, and a weight ratio (Pa) of the olefin copolymer in the resin composition is plotted on the abscissa:

(A) a propylene polymer, which has a melt flow rate of $12.0\pm3.0$ g/10 min. at 230° C. under a load of 2.16 kg, and which shows a main peak position (melting point) of $160\pm3°$ C. in crystal melting measured—using a differential scanning calorimeter (DSC), and shows a crystal melting enthalpy of $100\pm5$ J/g measured using a differential scanning calorimeter (DSC), (B) a propylene-ethylene copolymer, which has a melt flow rate of $3.0\pm0.5$ g/10 min. at 230° C. under a load of 2.16 kg, and which shows a main peak position (melting point) of $145\pm2°$ C. in a crystal melting measured—using a differential scanning calorimeter (DSC), and shows a crystal melting calorie enthalpy of $87\pm5$ J/g measured- using a differential scanning calorimeter (DSC), and (C) a propylene-ethylene copolymer, which has a melt flow rate of $1.0\pm0.6$ g/10 min. at 230° C. under a load of 2.16 kg, and which shows a main peak position (melting point) of $135\pm2°$ C. in a crystal melting measured—using a differential scanning calorimeter (DSC), and shows a crystal melting enthalpy of $60\pm5$ J/g measured—using a differential scanning calorimeter (DSC), $$T2C(Pa)=1/[PvA(Pa)/T2A+(1-PvA(Pa))/T2B] \quad (2)$$

wherein T2A and T2B are as defined above, and PvA(Pa) is a numerical value defined by the following formula (3), wherein $$PvA(Pa)=VA\times(1-Pa)/VC(Pa) \quad (3)$$

(1) VA is a volume ratio of components measured within a range of 70~150 μsec. in a free induction decay (FID) obtained from a pulse NMR measurement of the polypropylene resin; and (2) VC (Pa) is a volume ratio of components measured within a range of 70~150 μsec. in a free induction decay (FID) obtained from a pulse NMR measurement of the resin compositions different in the composition.

4. The adhesive film according to claim 3, wherein the olefin copolymer satisfies a requirement that the X defined by the formula (1) is not more than 0.040.

5. The adhesive film according to claim 1, wherein the olefin copolymer satisfies a requirement that an elastic recovery (S) defined by the following formula (4) is from 70 to 100%, $$\text{Elastic recovery } S(\%)=\text{stress-residual deformation recovery}\times100/\text{stretch deformation} \quad (4)$$

wherein the stress-residual deformation recovery and the stretch deformation are those obtained from a hysteresis curve of a resin composition comprising 70 parts by weight of the olefin copolymer and 30 parts by weight of one polypropylene resin selected from the group consisting of the following (B) and (C), provided that at least one resin composition satisfies the above-defined requirement, (B) a propylene-ethylene copolymer, which has a melt flow rate of $3.0\pm0.5$ g/10 min. at 230° C. under a load of 2.16 kg, and which shows a main peak position (melting point) of $145\pm2°$ C. in a crystal melting measured—using a differential scanning calorimeter (DSC), and shows a crystal melting enthalpy of $87\pm5$ J/g measured—using a differential scanning calorimeter (DSC), and (C) a propylene-ethylene copolymer, which has a melt flow rate of $1.0\pm0.6$ g/10 min. at 230° C. under a load of 2.16 kg, and which shows a main peak position (melting point) of $135\pm2°$ C. in a crystal melting measured—using a differential scanning calorimeter (DSC), and shows a crystal melting enthalpy of $60\pm5$ J/g measured—using a differential scanning calorimeter (DSC).

6. The adhesive film according to claim 1, wherein the adhesive layer comprises the olefin copolymer and a thermoplastic resin.

7. The adhesive film according to claim 1, wherein the adhesive layer comprises the olefin copolymer and a crystalline polyolefin resin.

* * * * *